United States Patent
Singh et al.

(10) Patent No.: US 12,081,309 B2
(45) Date of Patent: *Sep. 3, 2024

(54) ANTENNA FOR CELLULAR REPEATER SYSTEMS

(71) Applicant: KYOCERA AVX Components (San Diego), Inc., San Diego, CA (US)

(72) Inventors: Abhishek Singh, San Diego, CA (US); Mehak Garg, San Diego, CA (US); Sebastian Rowson, San Diego, CA (US); Nicholas Baird, Lakeside, CA (US); Hamid Eslami, San Diego, CA (US); Jeffrey L. Hilbert, Dana Point, CA (US); John Eric Shamblin, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,020

(22) Filed: Oct. 11, 2023

(65) Prior Publication Data

US 2024/0039617 A1    Feb. 1, 2024

Related U.S. Application Data

(62) Division of application No. 17/313,089, filed on May 6, 2021, now Pat. No. 11,824,619.

(Continued)

(51) Int. Cl.
*H04B 7/14* (2006.01)
*H01Q 1/24* (2006.01)
(Continued)

(52) U.S. Cl.
CPC ......... *H04B 7/15507* (2013.01); *H01Q 1/246* (2013.01); *H01Q 21/205* (2013.01); *H04B 17/309* (2015.01)

(58) Field of Classification Search
CPC ............. H04B 7/15507; H04B 17/309; H04B 7/1555; H04B 17/318; H04B 7/2606;
(Continued)

(56) References Cited

U.S. PATENT DOCUMENTS 5,533,027 A   7/1996 Akerberg et al.
6,765,536 B2  7/2004 Phillips et al.
(Continued)

FOREIGN PATENT DOCUMENTS

CA    2240153    10/1998

OTHER PUBLICATIONS

Wilson Electronics, "Omni Plus Building Antenna w/ N-Female Connector", Specification sheet, dated Jan. 9, 2020.—2 Pages.

*Primary Examiner* — Phuongchau Ba Nguyen
(74) *Attorney, Agent, or Firm* — Dority & Manning, P.A.

(57) ABSTRACT

A cellular repeater system is provided. The cellular repeater system includes an outdoor antenna communicatively coupled to a repeater. The outdoor antenna is configured to relay communications from the repeater to a cellular base station. The outdoor antenna includes a plurality of log-periodic antennas rotated relative to one another such that each of the plurality of log-periodic antennas is pointed in a different direction. The cellular repeater system includes a switching device configured to selectively couple one or more of the plurality of log-periodic antennas to a RF transceiver of the repeater in order to configure the outdoor antenna in a plurality of antenna modes. Each of the plurality of antenna modes have a distinct radiation pattern.

8 Claims, 10 Drawing Sheets

Related U.S. Application Data

(60) Provisional application No. 63/041,320, filed on Jun. 19, 2020, provisional application No. 63/039,054, filed on Jun. 15, 2020.

(51) Int. Cl.
*H01Q 21/20* (2006.01)
*H04B 7/155* (2006.01)
*H04B 17/309* (2015.01)

(58) Field of Classification Search
CPC ...... H04B 7/155; H01Q 1/246; H01Q 21/205; H01Q 11/105; H04W 88/04; H04W 16/26; H04L 2001/0097
See application file for complete search history.

(56) References Cited

U.S. PATENT DOCUMENTS

| | | | |
|---|---|---|---|
| 6,987,493 | B2 | 1/2006 | Chen |
| 7,068,234 | B2 | 6/2006 | Sievenpiper |
| 7,215,289 | B2 | 5/2007 | Harano |
| 7,501,982 | B2 | 3/2009 | Charash et al. |
| 7,830,320 | B2 | 11/2010 | Shamblin |
| 7,911,402 | B2 | 3/2011 | Rowson et al. |
| 8,362,962 | B2 | 1/2013 | Rowson et al. |
| 8,446,318 | B2 | 5/2013 | Ali et al. |
| 8,648,755 | B2 | 2/2014 | Rowson et al. |
| 8,717,241 | B2 | 5/2014 | Shamblin et al. |
| 9,065,496 | B2 | 6/2015 | Rowson et al. |
| 9,231,669 | B2 | 1/2016 | Desclos et al. |
| 9,240,634 | B2 | 1/2016 | Rowson et al. |
| 9,425,497 | B2 | 8/2016 | Pajona et al. |
| 9,439,151 | B2 | 9/2016 | Zhu et al. |
| 9,479,242 | B2 | 10/2016 | Desclos et al. |
| 9,590,703 | B2 | 3/2017 | Desclos et al. |
| 9,755,305 | B2 | 9/2017 | Desclos et al. |
| 9,755,580 | B2 | 9/2017 | Desclos et al. |
| 11,245,206 | B2 | 2/2022 | Singh |
| 2003/0092380 | A1 | 5/2003 | Soliman et al. |
| 2017/0110799 | A1 | 4/2017 | Holisaz et al. |
| 2018/0309198 | A1 | 10/2018 | Yu et al. |
| 2019/0089513 | A1* | 3/2019 | Pajona ................. H01Q 19/28 |
| 2019/0198969 | A1 | 6/2019 | Trusbanin et al. |
| 2020/0052727 | A1* | 2/2020 | Roe ..................... H04B 7/0689 |
| 2020/0112381 | A1* | 4/2020 | Barnes ............... H04B 7/15535 |
| 2020/0176893 | A1 | 6/2020 | Roe et al. |
| 2020/0251830 | A1 | 8/2020 | Charaabi |
| 2021/0050676 | A1 | 2/2021 | Rowson et al. |
| 2021/0058140 | A1 | 2/2021 | Schwab et al. |
| 2021/0152222 | A1 | 5/2021 | Rowson et al. |
| 2021/0288729 | A1* | 9/2021 | Hilbert ................. H04B 17/309 |
| 2022/0377573 | A1* | 11/2022 | Ashworth ............. H04W 16/26 |

* cited by examiner ative patterns of the outdoor antenna of FIG. 3 at a second

ANTENNA FOR CELLULAR REPEATER SYSTEMS

PRIORITY CLAIM

The present application is a divisional of U.S. application Ser. No. 17/313,089, titled "Antenna for Cellular Repeater Systems," having a filing date of May 6, 2021, which claims the benefit of priority of U.S. Provisional App. No. 63/039,054, titled "Antenna for Cellular Repeater Systems," having a filing date of Jun. 15, 2020, which is incorporated by reference herein. The present application also claims the benefit of priority of U.S. Provisional App. No. 63/041,320, titled "Antenna for Cellular Repeater Systems," having a filing date of Jun. 19, 2020, which is incorporated by reference herein.

FIELD

The present disclosure relates generally to cellular repeater systems and, more particularly, to an antenna for cellular repeater systems.

BACKGROUND

A cellular repeater system can include an outdoor antenna positioned outside of a space (e.g., building) and an indoor antenna positioned within the space. The outdoor antenna can communicate with a cellular base station (e.g., cell tower). The indoor antenna can communicate with user devices (e.g., smartphone, tablet, etc.) positioned within the space. The cellular repeater system can further include a repeater communicatively coupled between the indoor antenna and the outdoor antenna. The repeater can amplify inbound cellular signals received from the cellular base station and outbound cellular signals received from the user devices.

SUMMARY

Aspects and advantages of embodiments of the present disclosure will be set forth in part in the following description, or may be learned from the description, or may be learned through practice of the embodiments.

In one aspect, a cellular repeater system is provided. The cellular repeater system includes an outdoor antenna communicatively coupled to a repeater. The outdoor antenna is configured to relay communications from the repeater to a cellular base station. The outdoor antenna includes a plurality of log-periodic antennas rotated relative to one another such that each of the plurality of log-periodic antennas is pointed in a different direction. The cellular repeater system includes a switching device configured to selectively couple one or more of the plurality of log-periodic antennas to a RF transceiver of the repeater in order to configure the outdoor antenna in a plurality of antenna modes. Each of the plurality of antenna modes have a distinct radiation pattern.

In another aspect, a method of controlling operation of an outdoor antenna communicatively coupled to a repeater and configured to communicate with a cellular base station is provided. The method includes configuring, via one or more control devices, the outdoor antenna in each of a plurality of antenna modes, each of the plurality of antenna modes having a distinct radiation pattern. The method includes obtaining, via the repeater, data indicative of a channel quality indicator associated with communications between the outdoor antenna and the cellular base station while the outdoor antenna is configured in each of the plurality of antenna modes. The method includes determining, via the one or more control devices, one of the plurality of antenna modes as a selected antenna mode for the outdoor antenna based, at least in part, on the data indicative of the channel quality indicator for each of the plurality of antenna modes. The method further includes configuring, via the one or more control devices, the outdoor antenna in the selected antenna mode.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
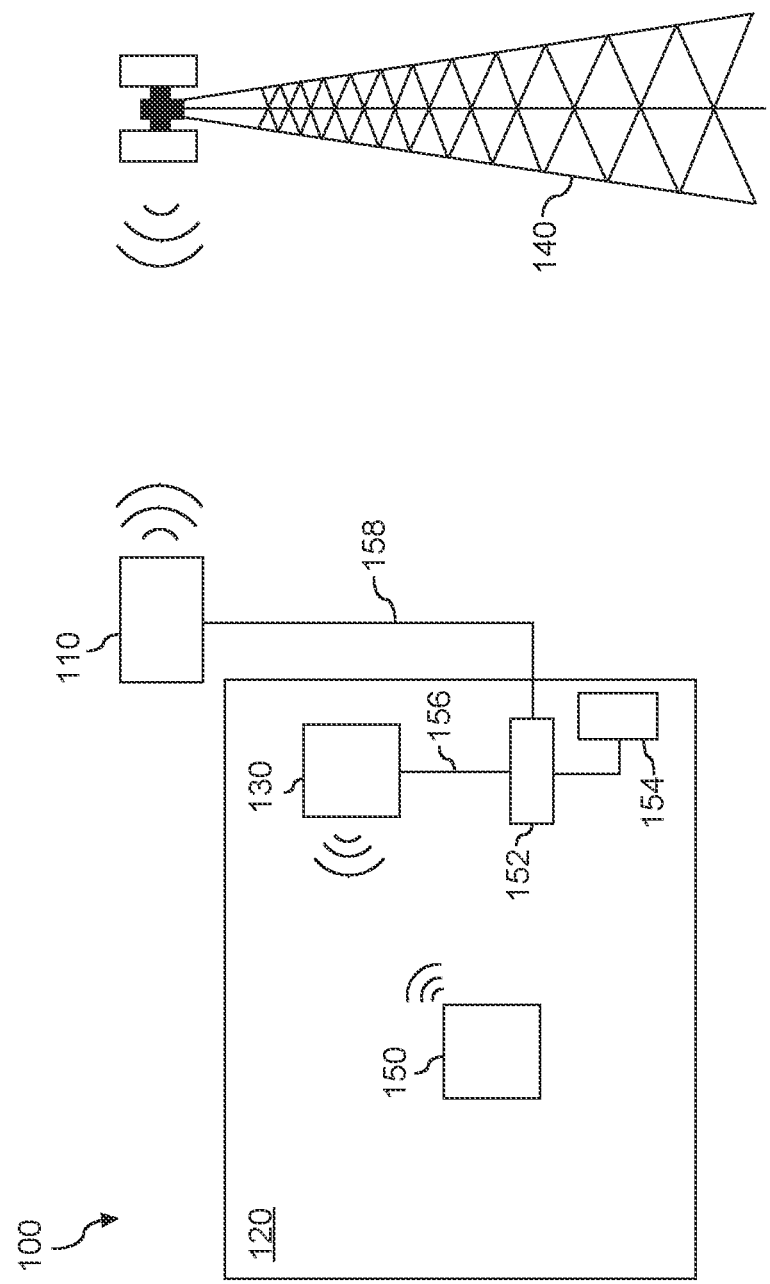
FIG. 1 depicts a cellular repeater system according to example embodiments of the present disclosure.

Reference now will be made in detail to embodiments, one or more examples of which are illustrated in the drawings. Each example is provided by way of explanation of the embodiments, not a limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a cellular repeater system. The cellular repeater system can include an indoor antenna positioned within a space (e.g., building) and an outdoor antenna positioned outside of the space. The indoor antenna can be configured to communicate with devices (e.g., user devices, smartphones, tablets, wearable devices, displays with one or more processors, etc.) positioned within the space. The outdoor antenna can be configured to communicate with a cellular base station (e.g., cell tower). As will be discussed below, example aspects of the present disclosure are directed to the outdoor antenna of the cellular repeater system.

The outdoor antenna can include a plurality of log-periodic antennas. In some implementations, each of the log-periodic antennas can include a central conductive element and a plurality of driven elements. Each of the plurality of driven elements can extend laterally from the central conductive element. Furthermore, in some implementations, the central conductive element and the plurality of driven elements can be disposed on a substrate having a trapezoidal shape. It should be appreciated, however, that the substrate can have any suitable shape.

The plurality of log-periodic antennas can be rotated relative to another such that each of the log-periodic antennas is pointed in a different direction. For instance, in some implementations, the outdoor antenna can include four log-periodic antennas that are rotated relative to one another by about 90 degrees such that each of the four log-periodic antenna is pointed in a different direction. More specifically, the first log-periodic antenna of the outdoor antenna can be pointed in a first direction. The second log-periodic antenna of the outdoor antenna can be rotated relative to the first log-periodic antenna by about 90 degrees such that the second log-periodic antenna is pointed in a second direction that is different from the first direction. The third log-periodic antenna of the outdoor antenna can be rotated relative to the first log-periodic antenna by about 180 degrees such that the third log-periodic antenna is pointed in a third direction that is different from the first direction and the second direction. The fourth log-periodic antenna of the outdoor antenna can be rotated relative to the first log-periodic antenna by about 270 degrees such that the fourth log-periodic antenna is pointed in a fourth direction that is different from each of the first, second and third directions. As used herein, the term "about" can refer to a range of values within 10 percent of a stated numerical value.

The cellular repeater system can include a switching device. The switching device can be configured to selectively couple one or more of the plurality of log-periodic antennas to a radio frequency (RF) transceiver associated with the repeater. In this manner, the switching device can be operated to selectively couple one or more of the log-periodic antennas to the RF transceiver in order to configure the outdoor antenna in a plurality of different antenna modes. It should be understood that a different log-periodic antenna or different combination of log-periodic antennas can be coupled to the RF transceiver for each of the plurality of antenna modes. In this manner, each of the plurality of antenna modes can have a distinct radiation pattern.

In some implementations, the switching device can be a single pole, multiple throw switching device. In such implementations, the number of throws associated with the switching device can correspond to the number of log-periodic antennas included in the outdoor antenna. For instance, in implementations in which the outdoor includes four log-periodic antennas, the switching device can be a single pole, four throw switching device. In such implementations, the switching device can selectively couple one or more of the four log-periodic antennas to the RF transceiver in order to configure the outdoor antenna in each of the plurality of antenna modes. For instance, the switching device can couple one of the log-periodic antennas to the RF transceiver in order to configure the outdoor antenna in one antenna mode of the plurality of antenna modes. Alternatively, the switching device can couple two or more of the log-periodic antennas to the RF transceiver in order to configure the outdoor antenna in a different antenna mode of the plurality of antenna modes.

In some implementations, the cellular repeater system can include one or more control devices configured to determine a selected antenna mode for the outdoor antenna based, at least in part, on data indicative of a channel quality indicator (CQI) associated with communications between the outdoor antenna and the cellular base station. The one or more control devices can be configured to configure the outdoor antenna in each of the plurality of antenna modes. For instance, the one or more control devices can be configured to control operation of the switching device to selectively couple one or more of the log-periodic antennas to the RF transceiver in order to configure the outdoor antenna in each of the plurality of antenna modes.

The one or more control devices can be configured to obtain data indicative of the CQI associated with communications between the outdoor antenna and the cellular base station. Examples of data indicative of the CQI associated with communications between the outdoor antenna and the cellular base station can include a received signal strength indicator (RSSI), a signal to noise ratio (SNR), a signal to interference plus noise ratio (SNIR), a magnitude error ratio (MER), an error vector magnitude (EVM), a bit error rate (BER), a block error rate (BLER), a packet error rate (PER), or combinations of the foregoing, and/or various other metrics.

The one or more control devices can be configured to select one of the plurality of antenna modes as a selected antenna mode for the outdoor antenna based, at least in part, on the data indicative of the CQI. Furthermore, the one or more control devices can configure the outdoor antenna in the selected antenna mode. For instance, the one or more control devices can be configured to control operation of the switching device to selectively couple one or more of the log-periodic antennas to the RF transceiver in order to configure the outdoor antenna in the selected antenna mode.

In some implementations, the selected antenna mode can correspond to an antenna mode in which only one of the periodic-log antennas is coupled to the RF transceiver via the switching device. In such implementations, the outdoor antenna can have a directional radiation pattern when configured in the selected antenna mode. In alternative implementations, the selected antenna mode can correspond to an antenna mode in which multiple of the log-periodic antennas are coupled to the RF transceiver via the switching device. For instance, in some implementations, the selected antenna mode can correspond to an antenna mode in which each of the plurality of log-periodic antennas is coupled to the RF transceiver via the switching device. In such implementations, the outdoor antenna can have an omni-directional radiation pattern when configured in the selected antenna mode.

The cellular repeater system according to example aspects of the present disclosure can provide numerous technical effects and benefits. For instance, the plurality of log-periodic antennas of the outdoor antenna of the cellular repeater system can be rotated relative to one another such that each of the log-periodic antennas is pointed in a different direction. Furthermore, the switching device of the cellular repeater system can, as discussed above, be operated to selectively couple one or more of the log-periodic antennas to a RF transceiver to configure the outdoor antenna in a plurality of different antenna modes. In this manner, the antenna mode of the outdoor antenna can be adjusted to tailor a radiation pattern of the outdoor antenna as needed to improve communications (e.g., reduced latency) between the outdoor antenna and the cellular base station.

Figure 2:
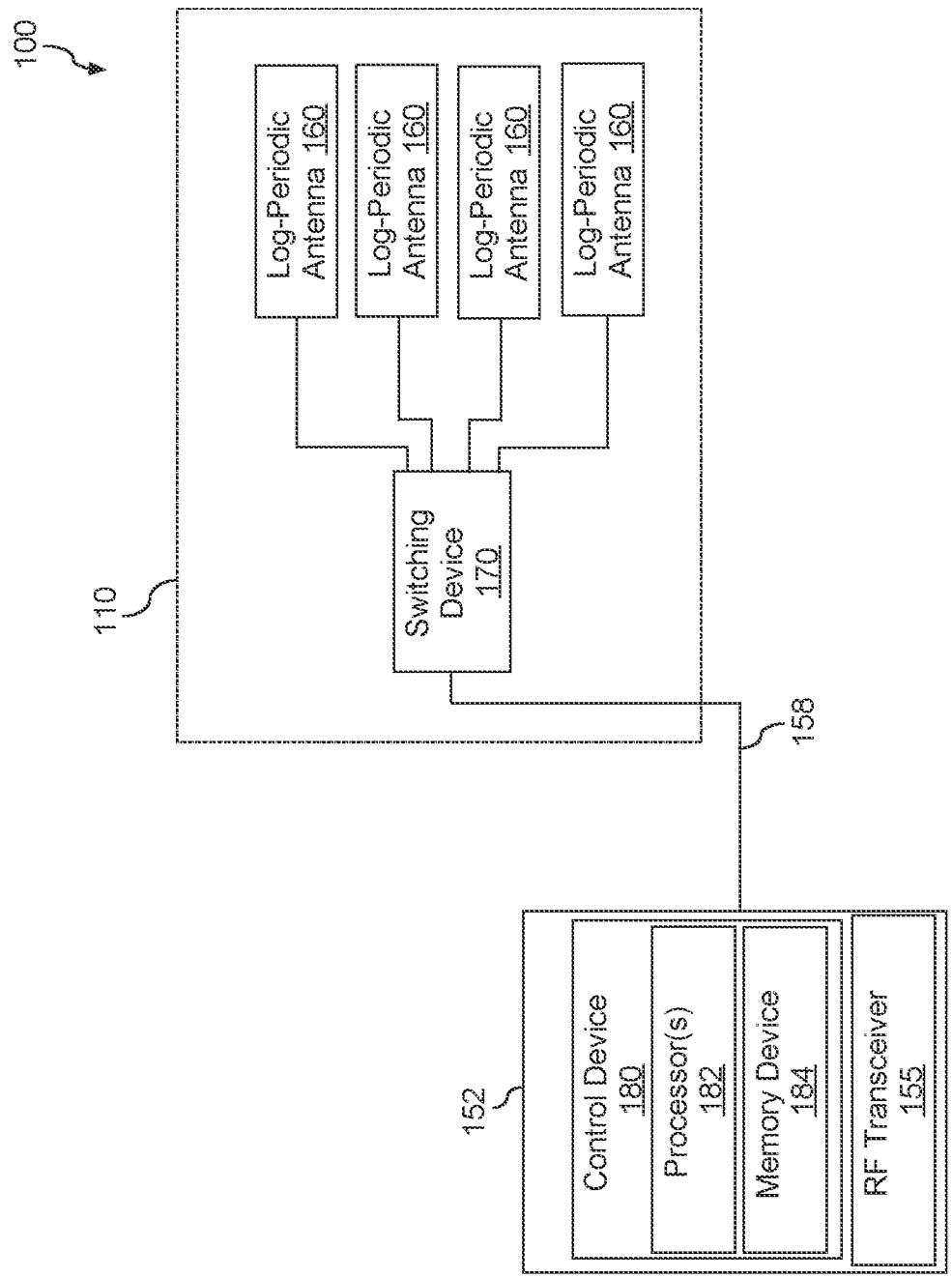
FIG. 2 depicts components of cellular repeater system according to example embodiments of the present disclosure.

Referring now to FIGS. 1 and 2, a cellular repeater system 100 is provided according to example embodiments of the present disclosure. As shown, the cellular repeater system 100 can include a first antenna 110 (hereinafter, outdoor antenna 110) positioned outside of a space 120 (e.g., room, building) and a second antenna 130 (hereinafter, indoor antenna 130) positioned within the space 120. The outdoor antenna 110 can be configured to communicate with a cellular base station 140 (e.g., cell tower). The indoor antenna 130 can be configured to communicate with devices 150 (e.g., smartphone, tablet, etc.) positioned within the space 120. It should be understood that the devices 150 can include any device having an antenna configured to facilitate communication with the indoor antenna 130 via a cellular network. It should also be understood that the outdoor antenna 110 and the indoor antenna 130 can be configured to communicate over any suitable range of frequencies. For instance, in some implementations, the outdoor antenna 110 and the indoor antenna 130 can be configured to communicate over a range of frequencies that spans from 600 MHz to 6 Gigahertz (GHz). It should be understood that the range of frequencies can include the Long Term Evolution (LTE) frequency bands as well as Sub-6 5G frequency bands. In some implementations, the range of frequencies can span from 600 MHz to 3 GHz. In such implementations, the range of frequencies can include LTE frequency bands and LTE-Advanced frequency bands.

The cellular repeater system 100 can further include a repeater 152. In some implementations, the repeater 152 can be positioned within the space 120. As shown, the repeater 152 can be configured to receive electrical power from a power supply 154. In this manner, the power supply 154 can supply electrical power for a RF transceiver 155 (shown in FIG. 2). Furthermore, the repeater 152 can be coupled between the indoor antenna 130 and the outdoor antenna 110 via a first transmission line 156 and a second transmission line 158, respectively. In this manner, the RF transceiver 155 of the repeater 152 can amplify inbound signals (e.g., cellular signals) received from the cellular base station 140 and repeat the amplified inbound signal to the devices 150 via the indoor antenna 130. Likewise, the RF transceiver 155 can amplify outbound signals (e.g., cellular signals) received from the devices 150 and repeat the amplified outbound signals to the cellular base station 140 via the outdoor antenna 110.

As shown in FIG. 2, the outdoor antenna 110 can include a plurality of log-periodic antennas 160. For instance, in some implementations, the outdoor antenna 110 can include four log-periodic antennas 160. It should be understood that, in other implementations, the outdoor antenna 110 can include more or fewer log-periodic antennas 160. For instance, in some implementations, the outdoor antenna 110 can include two log-periodic antennas 160. In alternative implementations, the outdoor antenna 110 can include five or more log-periodic antennas 160.

The cellular repeater system 100 can include a switching device 170. The switching device 170 can be configured to selectively couple one or more of the plurality of log-periodic antennas 160 to the RF transceiver 155 via the second transmission line 158. In this manner, the switching device 170 can be operated to selectively couple one or more of the log-periodic antennas 160 to the RF transceiver 155 in order to configure the outdoor antenna 110 in a plurality of different antenna modes. It should be understood that a different log-periodic antenna 160 or different combination of log-periodic antennas 160 can be coupled to the RF transceiver 155 for each of the plurality of antenna modes. In this manner, each of the plurality of antenna modes can have a distinct radiation pattern.

In some implementations, the switching device 170 can be a single pole, multiple throw switching device. In such implementations, the number of throws associated with the switching device 170 can correspond to the number of log-periodic antennas 160 included in the outdoor antenna 110. For instance, in implementations in which the outdoor antenna 110 includes four log-periodic antennas 160, the switching device 170 can be a single pole, four throw switching device. In such implementations, the switching device 170 can selectively couple one or more of the log-periodic antennas 160 to the RF transceiver 155 via the second transmission line 158 in order to configure the outdoor antenna 110 in each of the plurality of antenna modes. For instance, the switching device 170 can couple one of the log-periodic antennas 160 to the RF transceiver 155 in order to configure the outdoor antenna 110 in one antenna mode of the plurality of antenna modes. Alternatively, the switching device 170 can couple two or more of the log-periodic antennas 160 to the RF transceiver 155 in order to configure the outdoor antenna 110 in a different antenna mode of the plurality of antenna modes.

In some implementations, the cellular repeater system 100 can include one or more control devices 180 (only one shown). As shown, in some implementations, the one or more control devices 180 can be associated with the repeater 152. It should be appreciated, however, that the one or more control devices 180 can be associated with any suitable component of the cellular repeater system 100. For instance, in some implementations, the one or more control devices 180 can be associated with the outdoor antenna 110. More specifically, the one or more control devices 180 can be included on a circuit board (not shown) of the outdoor antenna 110.

The one or more control devices 180 can include one or more processors 182 and one or more memory devices 184. The processor(s) 182 can include any suitable processing device, such as a microprocessor, microcontroller, integrated circuit, logic device, or other suitable processing device. The memory device(s) 184 can include one or more computer-readable media, including, but not limited to, non-transitory computer-readable media, RAM, ROM, hard drives, flash drives, or other memory devices.

The memory device(s) 184 can store information accessible by the processor(s) 182, including computer-readable instructions that can be executed by the processor(s) 182.

The computer-readable instructions can be any set of instructions that, when executed by the processor(s) 182, cause the processor(s) 182 to perform operations. The computer-readable instructions can be software written in any suitable programming language or may be implemented in hardware. In some embodiments, the computer-readable instructions can be executed by the processor(s) 182 to cause the processor(s) 182 to perform operations, such as controlling operation of the outdoor antenna 110.

In some implementations, the one or more control devices 180 can be configured to determine a selected antenna mode for the outdoor antenna 110 based, at least in part, on data indicative of a channel quality indicator (CQI) associated with communications between the outdoor antenna 110 and the cellular base station 140 for each of the plurality of antenna modes of the outdoor antenna 110. For instance, the one or more control devices 180 can be configured to provide control signals associated with controlling operation of the switching device 170 to selectively couple one or more of the log-periodic antennas 160 to the RF transceiver 155 in order to configure the outdoor antenna 110 in each of the plurality of antenna modes.

In some implementations, the one or more control devices 180 can be configured to communicate the one or more control signals to the switching device 170 via the second transmission line 158. More specifically, the one or more control devices 180 can be configured to modulate the one or more control signals onto an RF signal (e.g., amplified outbound signal) that is communicated to the outdoor antenna 110 via the second transmission line 158. In such implementations, the outdoor antenna 110 can include RF circuitry (not shown) configured to demodulate the RF signal to obtain the one or more control signals associated with controlling operation of the switching device 170 to configure the outdoor antenna 110 in the selected antenna mode.

In alternative implementations, the one or more control devices 180 can be configured to communicate the one or more control signals to the switching device 170 via a control line (not shown) that is separate from the second transmission line 158. In this manner, one or more control signals can be communicated to the outdoor antenna 110 separately from the RF signal (e.g., amplified outbound signals) the RF transceiver 155 transmits to the outdoor antenna 110 via the second transmission line 158.

The one or more control devices 180 can be configured to obtain data indicative of the CQI associated with communications between the outdoor antenna 110 and the cellular base station 140. Examples of data indicative of the CQI associated with communications between the outdoor antenna and the cellular base station can include a received signal strength indicator (RSSI), a signal to noise ratio (SNR), a signal to interference plus noise ratio (SNIR), a magnitude error ratio (MER), an error vector magnitude (EVM), a bit error rate (BER), a block error rate (BLER), a packet error rate (PER), or combinations of the foregoing, and/or various other metrics.

The one or more control devices 180 can be configured to select one of the plurality of antenna modes as a selected antenna mode for the outdoor antenna 110 based, at least in part, on the data indicative of the CQI. Furthermore, the one or more control devices 180 can configure the outdoor antenna 110 in the selected antenna mode. For instance, the one or more control devices 180 can be configured to control operation of the switching device 170 to selectively couple one or more of the log-periodic antennas 160 to the RF transceiver 155 in order to configure the outdoor antenna 110 in the selected antenna mode.

In some implementations, the selected antenna mode can correspond to an antenna mode in which only one of the log-periodic antennas 160 is coupled to the RF transceiver 155 via the switching device 170. In such implementations, the outdoor antenna 110 can have a directional radiation pattern when configured in the selected antenna mode. In alternative implementations, the selected antenna mode can correspond to an antenna mode in which multiple of the log-periodic antennas 160 are coupled to the RF transceiver 155 via the switching device 170. For instance, in some implementations, the selected antenna mode can correspond to an antenna mode in which each of the plurality of log-periodic antennas 160 is coupled to the RF transceiver 155 via the switching device 170. In such implementations, the outdoor antenna 110 can have an omni-directional radiation pattern when configured in the selected antenna mode.

When multiple (e.g., more than 2) log-periodic antennas of the outdoor antenna 110 are coupled to the RF transceiver 155 via the switching device 170, the one or more control devices 180 can, in some implementations, be configured to adjust a RF transmit power associated with each of the log-periodic antennas 160 coupled to the RF transceiver 155. More specifically, the one or more control devices 180 can be configured to adjust the RF transmit power such that a gain of each of the log-periodic antennas 160 coupled to the RF transceiver 155 does not decrease.

Figure 3:
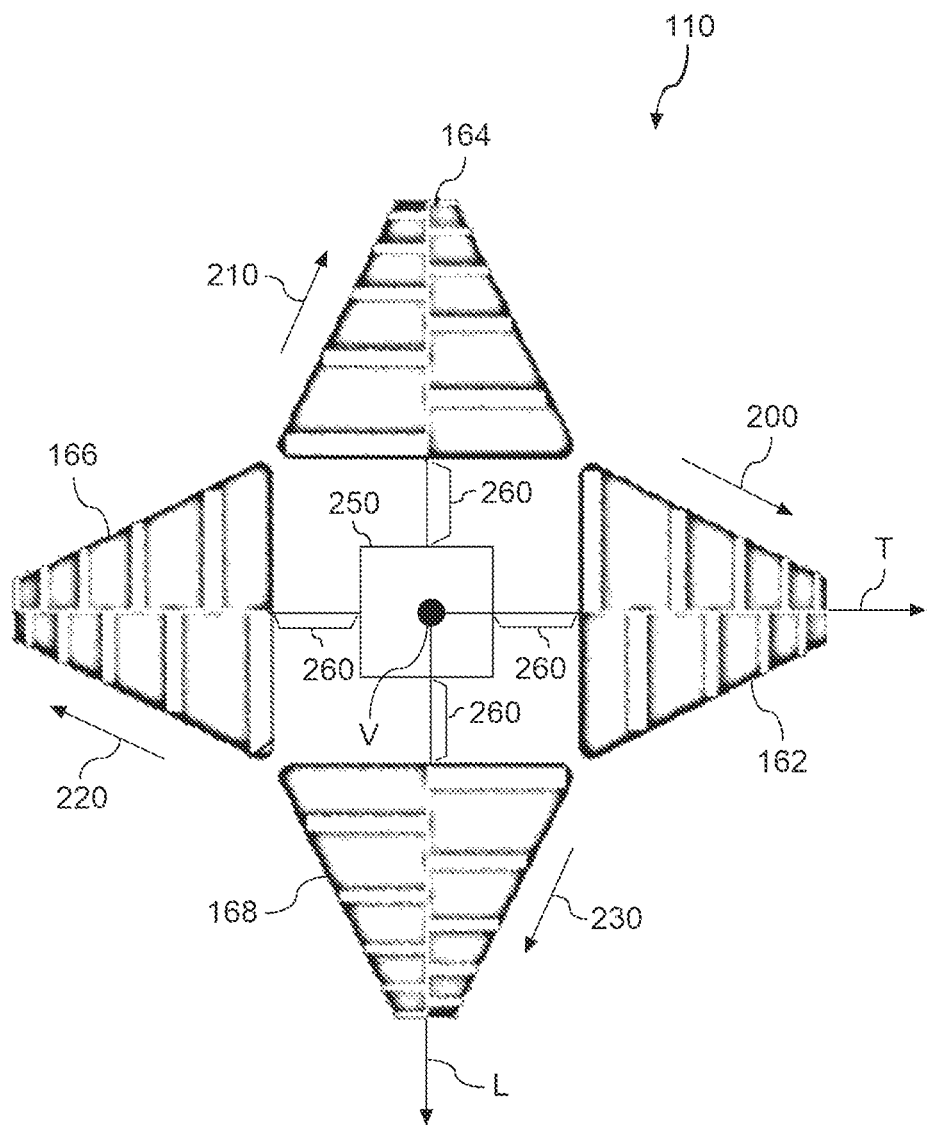
FIG. 3 depicts a top view of an outdoor antenna of the cellular repeater system according to example embodiments of the present disclosure.
Figure 4:
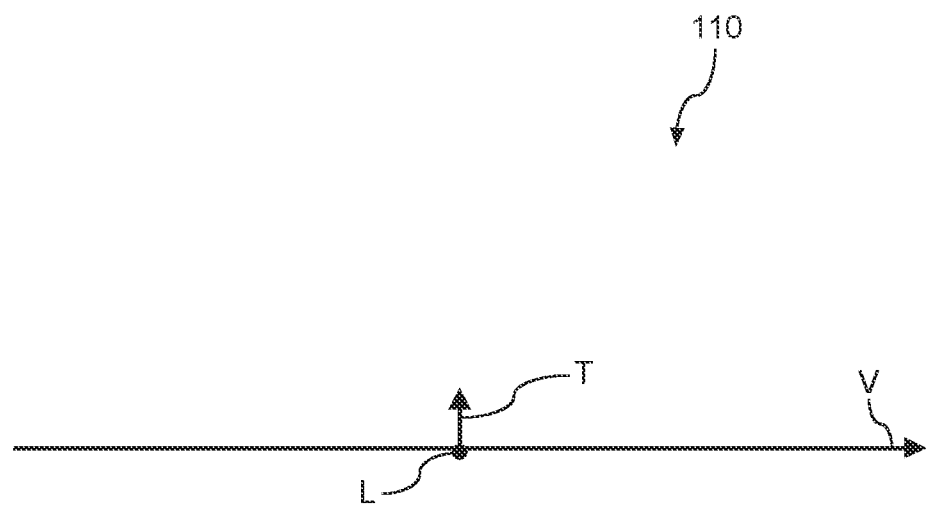
FIG. 4 depicts a side view of the outdoor antenna of FIG. 3 according to example embodiments of the present disclosure.

Referring now to FIGS. 3 and 4, an embodiment of the outdoor antenna 110 is provided according to the present disclosure. FIG. 3 depicts a top view of the outdoor antenna 110. FIG. 4 depicts a side view of the outdoor antenna 110. The outdoor antenna 110 can define a coordinate system that includes a lateral axis L, a longitudinal axis T, and a vertical direction V.

As shown, the outdoor antenna 110 can include four log-periodic antennas. More specifically, the outdoor antenna 110 can include a first log-periodic antenna 162, a second log-periodic antenna 164, a third log-periodic antenna 166, and a fourth log-periodic antenna 168. As will be discussed below, the log-periodic antennas 162, 164, 166, 168 can be rotated relative to one another such that each of the log-periodic antennas 162, 164, 166, 168 is pointed in a different direction. For instance, in some implementations, the log-periodic antennas 162, 164, 166, 168 can be rotated relative to one another. However, as shown in FIG. 4, each of the log-periodic antennas 162, 164, 166, 168 can be positioned within the same plane.

The first log-periodic antenna 162 can be pointed in a first direction 200. The second log-periodic antenna 164 can be rotated relative to the first log-periodic antenna 162 by about 90 degrees such that the second log-periodic antenna 164 is pointed in a second direction 210 that is different from the first direction 200. The third log-periodic antenna 166 can be rotated relative to the first log-periodic antenna 162 by about 180 degrees such that the third log-periodic antenna 166 is pointed in a third direction 220 that is different from the first direction 200 and the second direction 210. The fourth log-periodic antenna 168 can be rotated relative to the first log-periodic antenna 162 by about 270 degrees such that the fourth log-periodic antenna 168 is pointed in a fourth direction 230 that is different from each of the first direction 200, the second direction 210, and the third direction 220.

In some implementations, the switching device 170 (FIG. 2) and the plurality of log-periodic antennas 162, 164, 166, 168 can be coupled to a circuit board 250. More specifically, each of the plurality of log-periodic antennas 162, 164, 166, 168 can be coupled to a ground plane (not shown) of the circuit board 250. In some implementations, each of the plurality of log-periodic antennas 162, 164, 166, 168 can be coupled to the circuit board 250 such that each of the plurality of log-periodic antennas 162, 164, 166, 168 is spaced apart from the circuit board 250. In some implementations, each of the plurality of log-periodic antennas 162, 164, 166, 168 can be spaced apart from the circuit board 250 by a distance 260 ranging from about 40 millimeters to about 70 millimeters.

In some implementations, a width dimension of the outdoor antenna 110 as measured along lateral axis L and a height dimension of the outdoor antenna as measured along the vertical axis V can each range from about 600 millimeters to about 630 millimeters. Furthermore, in some implementations, the width dimension of the outdoor antenna 110 can be substantially the same as the height dimension of the outdoor antenna 110. Alternatively, or additionally, a length dimension of the outdoor antenna 110 as measured along the longitudinal axis T can be shorter than the width dimension of the outdoor antenna 110 and the height dimension of the outdoor antenna 110. For instance, in some implementations, the length dimension of the outdoor antenna 110 can range from about 220 millimeters to about 250 millimeters.

Figure 5:
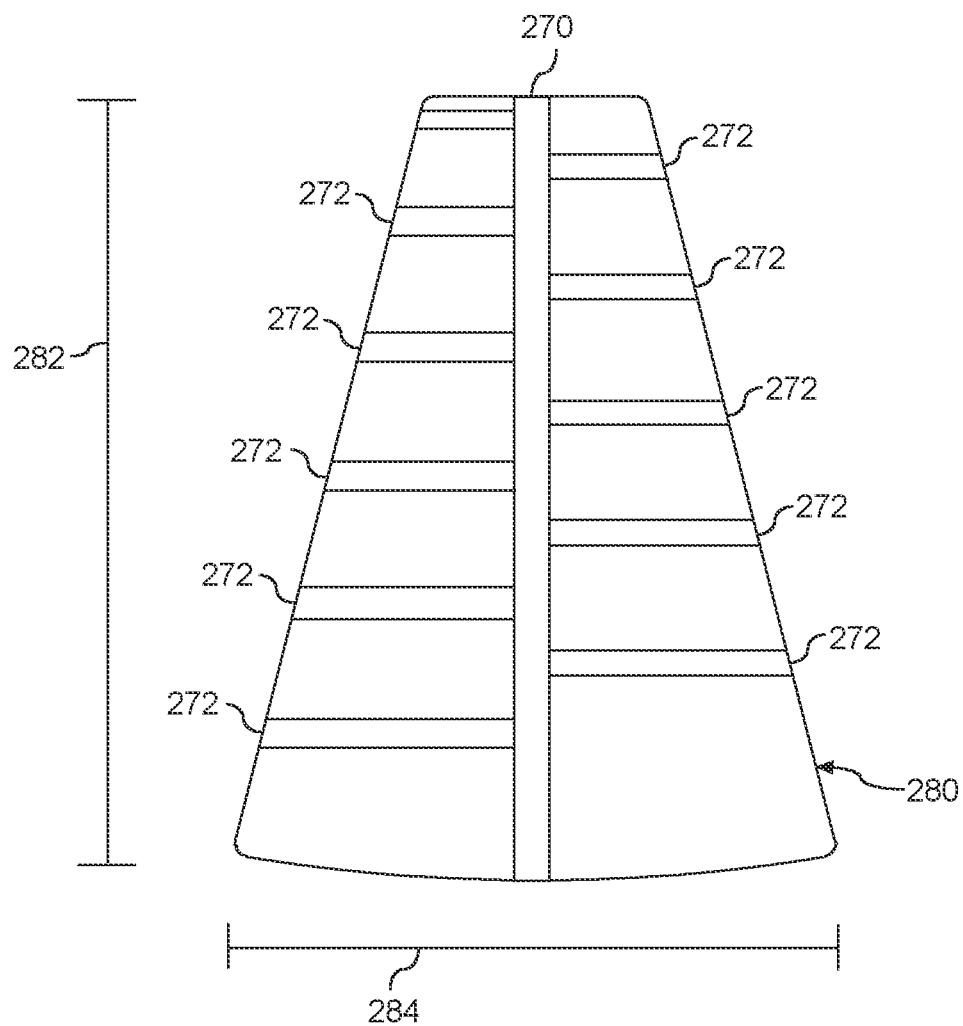
FIG. 5 depicts a log-periodic antenna of an outdoor antenna according to example embodiments of the present disclosure.

Referring now to FIG. 5, in some implementations, each of the log-periodic antennas 162, 164, 166, 168 can include a central conductive element 270 and a plurality of driven elements 272. Each of the plurality of driven elements 272 can extend axially from the central conductive element 270. Furthermore, in some implementations, the central conductive element 270 and the plurality of driven elements 272 can be disposed on a substrate 280 having a length dimension 282 and a width dimension 284. The length dimension 282 can be longer than the width dimension 284. For instance, in some implementations, the length dimension 282 can range from about 180 millimeters to about 200 millimeters. Furthermore, in some implementations, a shape of the substrate 280 can be trapezoidal. It should be appreciated, however, that the substrate 280 can have any suitable shape.

In some implementations, a length of the driven elements 272 can taper along a length of the central conductive element 270. For instance, the length of the driven elements 272 can become progressively shorter along the length of the central conductive element 270. In this manner, the length of each of the driven elements 272 can be different.

Figure 6A:
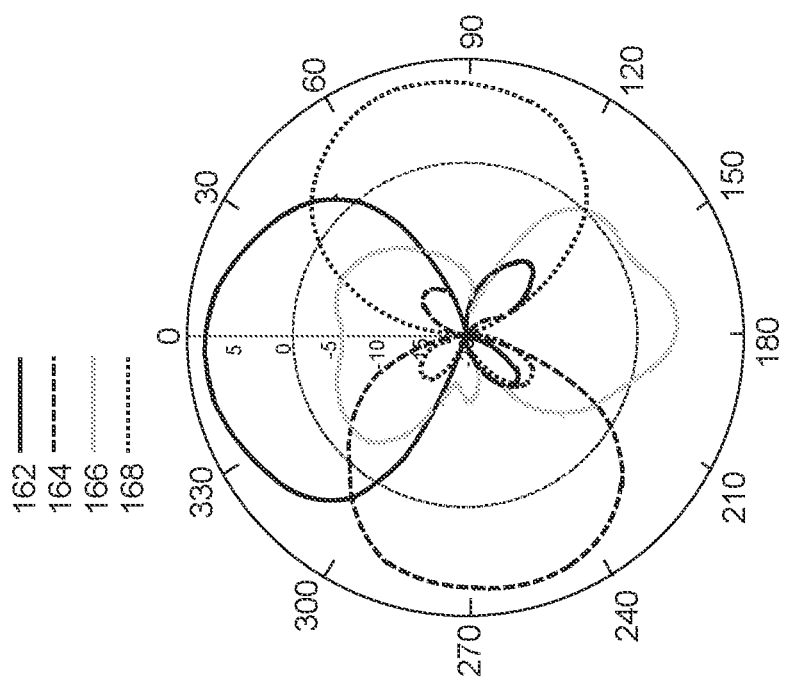
FIG. 6A depicts a two-dimensional plot of radiation patterns of the outdoor antenna of FIG. 3 at a first frequency according to example embodiments of the present disclosure.
Figure 6B:
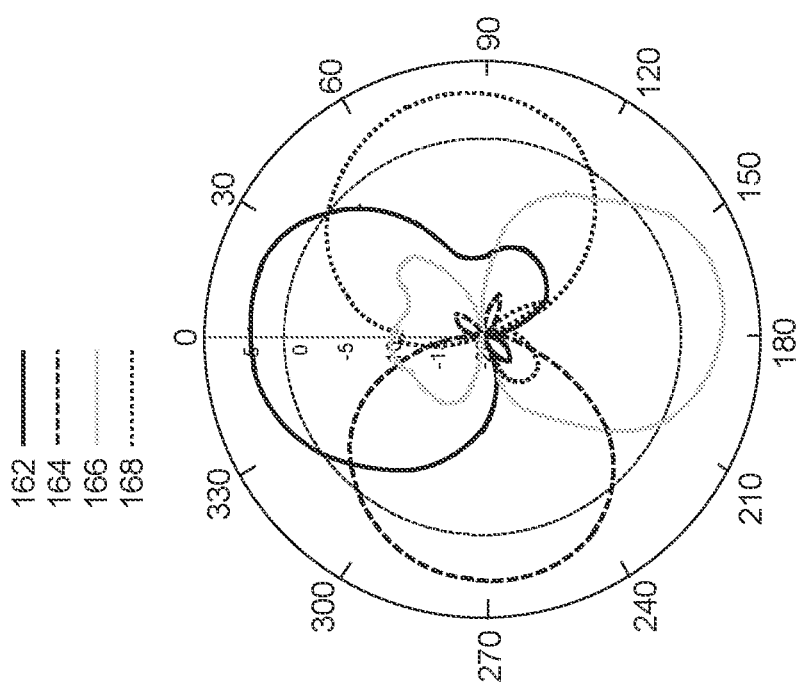
FIG. 6B depicts a two-dimensional plot of radiation patterns of the outdoor antenna of FIG. 3 at a second frequency according to example embodiments of the present disclosure.

Referring now to FIGS. 6A and 6B, a two-dimensional plot of a radiation pattern for each of the plurality of log-periodic antennas 162, 164, 166, 168 is provided according to example embodiments of the present disclosure. FIG. 6A depicts the radiation pattern for each of the log-periodic antennas 162, 164, 166, 168 at a first frequency (e.g., 800 Megahertz). FIG. 6B depicts the radiation for each of the log-periodic antennas 162, 164, 166, 168 at a second frequency (e.g., 1700 MHz) that is different than the first frequency. As shown, the radiation pattern for each of the log-periodic antennas 162, 164, 166, 168 can be directional. Furthermore, since the log-periodic antennas 162, 164, 166, 168 are rotated relative to one another by about 90 degrees, the radiation pattern for each of the plurality of log-periodic antennas 162, 164, 166, 168 can be directed in different directions. For instance, the radiation pattern for the first log-periodic antenna 162 and the radiation pattern for the third log-periodic antenna 166 can be directed in opposing directions. Furthermore, the radiation pattern for the second log-periodic antenna 164 and the radiation pattern for the fourth log-periodic antenna 168 can be directed in opposing directions.

Figure 7:
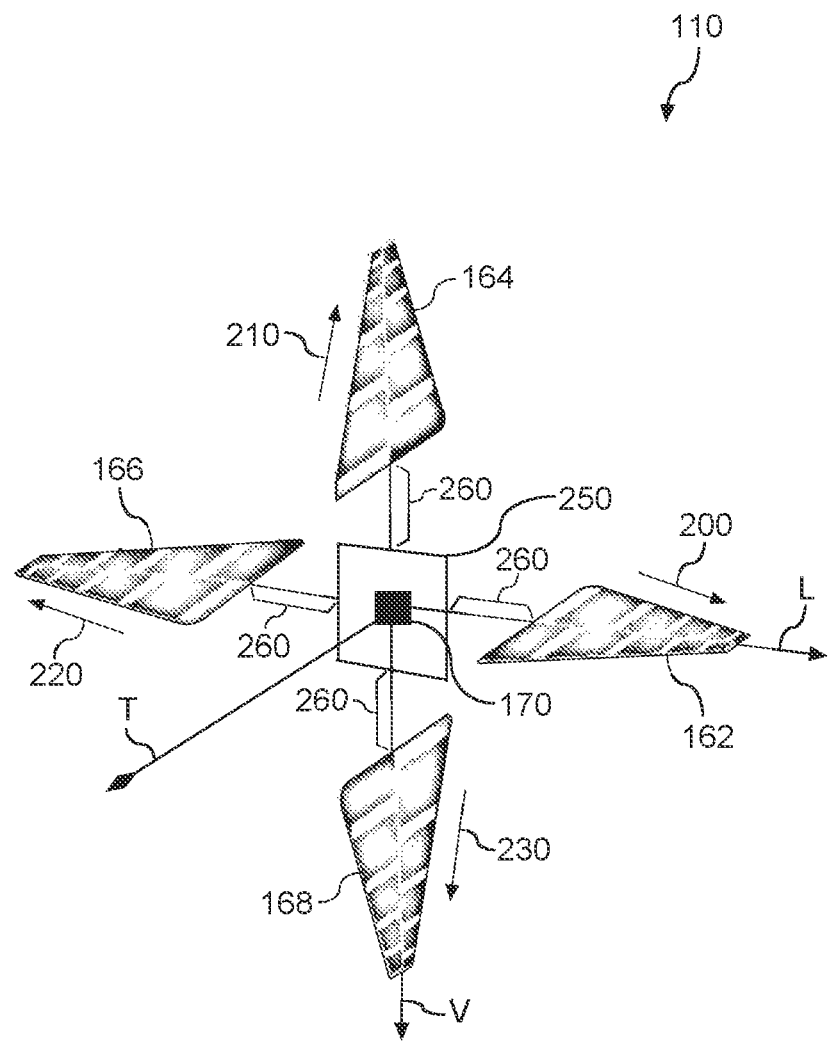
FIG. 7 depicts an outdoor antenna according to example embodiments of the present disclosure.

Referring now to FIG. 7, another embodiment of the outdoor antenna 110 is provided according to example embodiments of the present disclosure. As shown, the outdoor antenna 110 can define the coordinate system that includes the lateral axis L, the longitudinal direction T, and the vertical direction V. The outdoor antenna 110 can include the first log-periodic antenna 162, the second log-periodic antenna 164, the third log-periodic antenna 166, and the fourth log-periodic antenna 168. The log-periodic antennas 162, 164, 166, 168 can be rotated relative to one another such that each of the log-periodic antennas 162, 164, 166, 168 is pointed in a different direction. Furthermore, the log-periodic antennas 162, 164, 166, 168 can be rotated relative to one another such that the first log-periodic antenna 162 is positioned within a first plane and the second log-periodic antenna 164 is positioned within a second plane that is substantially perpendicular to the first plane. Likewise, the third log-periodic antenna 166 can be positioned within the first plane and the fourth log-periodic antenna 168 can be positioned within the second plane.

Figure 8B:
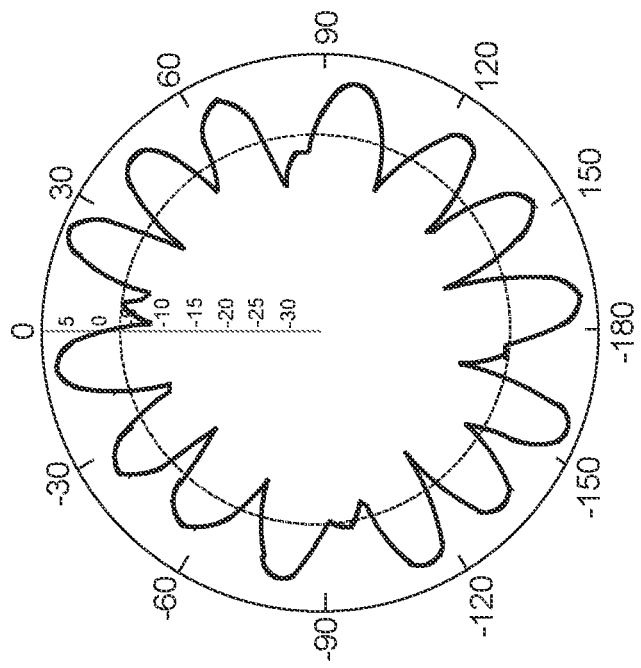
FIG. 8B depicts a two-dimensional plot of a radiation pattern of the outdoor antenna of FIG. 7 at a second frequency according to example embodiments of the present disclosure.
Figure 8A:
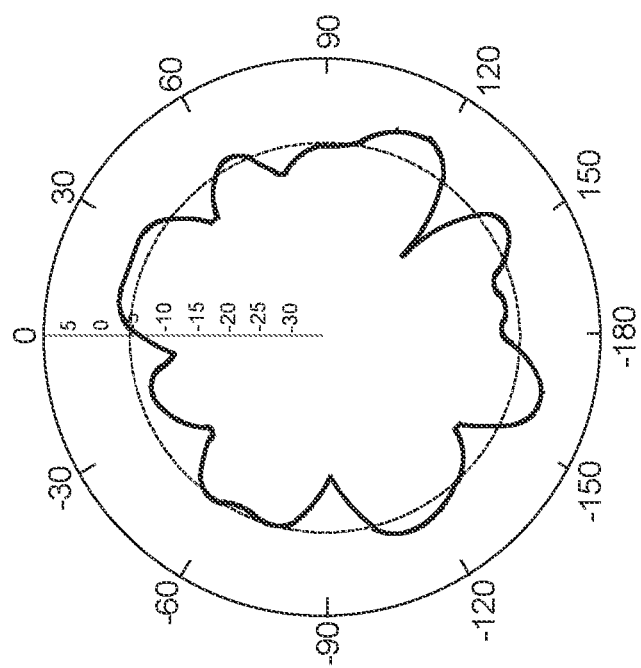
FIG. 8A depicts a two-dimensional plot of a radiation pattern of the outdoor antenna of FIG. 7 at a first frequency according to example embodiments of the present disclosure.

Referring now to FIGS. 8A and 8B, a two-dimensional plot of a total gain of the outdoor antenna 110 of FIG. 7 is provided according to example embodiments of the present disclosure. FIG. 6A depicts the total gain of the outdoor antenna 110 at a first frequency (e.g., 800 MHz). FIG. 6B depicts the total gain of the outdoor antenna 110 at a second frequency (e.g., 1900 MHz).

Figure 9A:
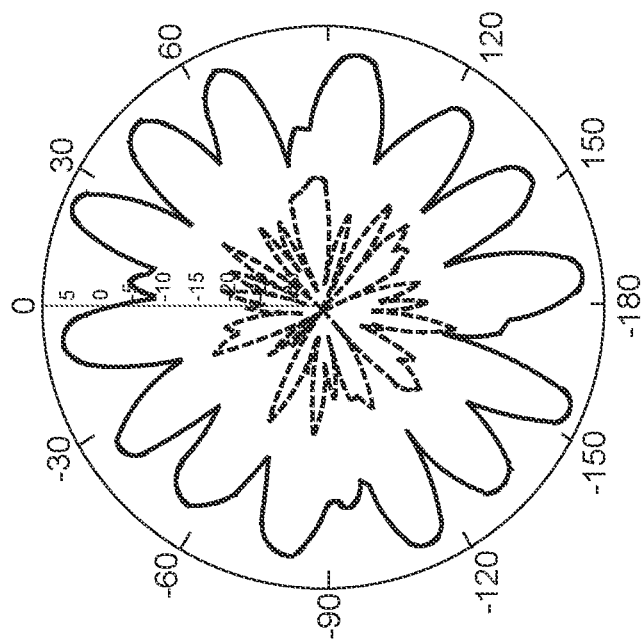
FIG. 9A depicts a polarization plot of the outdoor antenna of FIG. 7 at the first frequency according to example embodiments of the present disclosure.
Figure 9B:
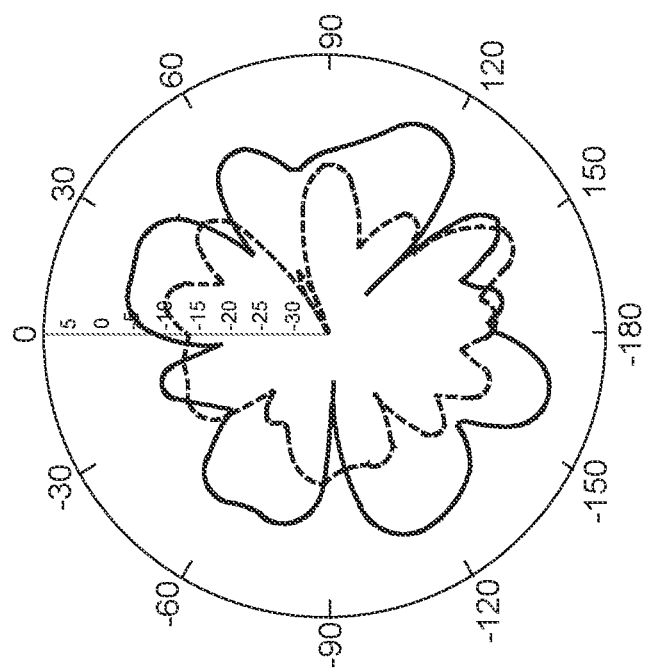
FIG. 9B depicts a polarization plot of the outdoor antenna of FIG. 7 at the second frequency according to example embodiments of the present disclosure.

Referring now to FIGS. 9A and 9B, a two-dimensional polarization plot for the outdoor antenna 110 of FIG. 7 is provided according to example embodiments of the present disclosure. FIG. 9A depicts a two-dimensional polarization plot for the outdoor antenna 110 at a first frequency (e.g., 800 MHz). FIG. 9B depicts a two-dimensional polarization plot for the outdoor antenna 110 at a second frequency (e.g., 1900 MHz). As shown, the outdoor antenna 110 exhibits dominant vertical polarization at both the first frequency and the second frequency.

Figure 10:
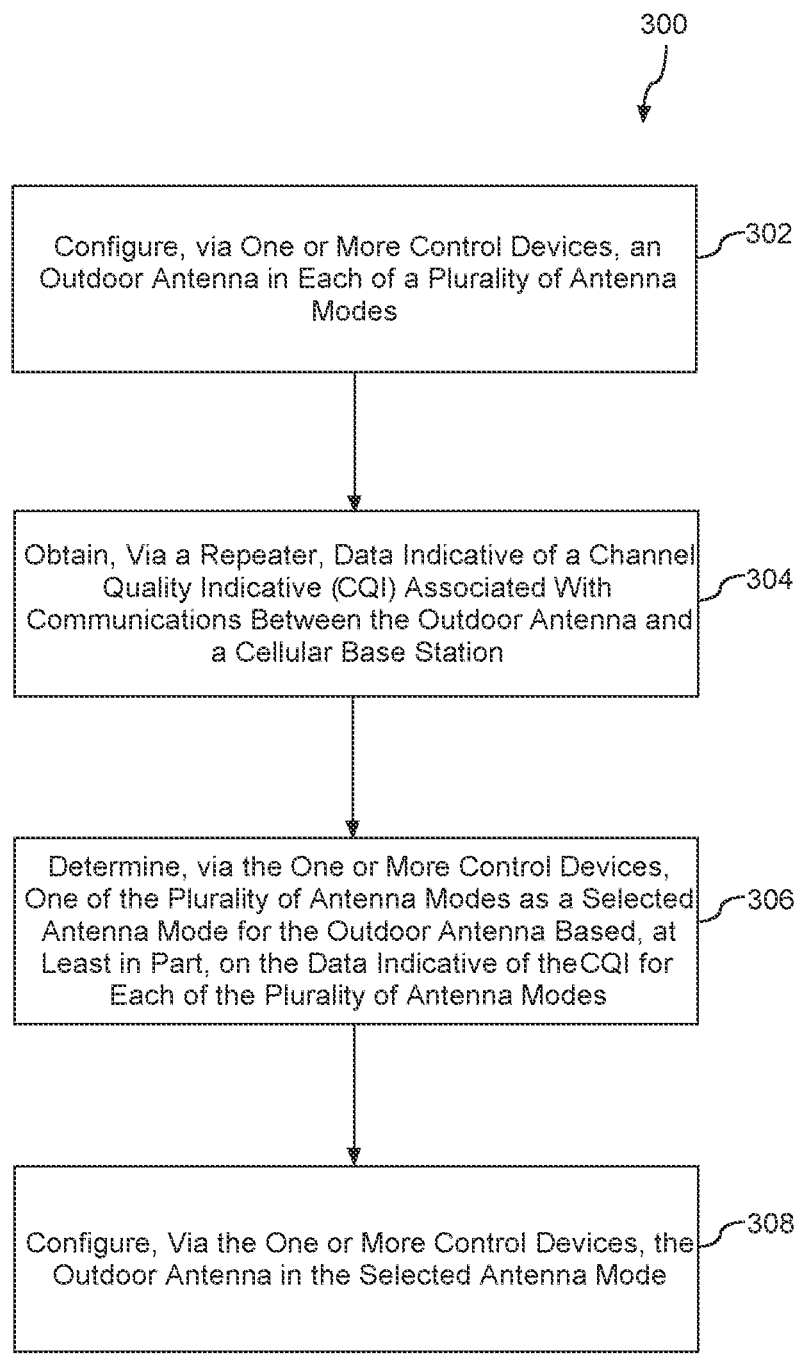
FIG. 10 depicts a flow diagram of a method for controlling operation of an outdoor antenna communicatively coupled to a repeater and configured to communicate with a cellular base station according to example embodiments of the present disclosure.

Referring now to FIG. 10, a flow diagram of a method 300 of controlling operation of an outdoor antenna communicatively coupled to a repeater and configured to communicate with a cellular base station. In general, the method 300 will be discussed herein with reference to the cellular repeater system 100 described above with reference to FIGS. 1 and 2. In addition, although FIG. 10 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (302), the method 300 includes configuring, via one or more control devices, the outdoor antenna in each of a plurality of antenna modes. For instance, in some implementations, the one or more control devices can be configured to control operation of a switching device to selectively couple one or more of the log-periodic antennas to a RF transceiver associated with the repeater in order to configure the outdoor antenna in each of the plurality of antenna modes.

At (304), the method 300 includes obtaining, via the repeater, data indicative of a channel quality indicator associated with communications between the outdoor antenna and the cellular base station while the outdoor antenna is configured in each of the plurality of antenna modes. Examples of data indicative of the CQI associated with communications between the outdoor antenna and the cellular base station can include a received signal strength indicator (RSSI), a signal to noise ratio (SNR), a signal to interference plus noise ratio (SNIR), a magnitude error ratio (MER), an error vector magnitude (EVM), a bit error rate (BER), a block error rate (BLER), a packet error rate (PER), or combinations of the foregoing, and/or various other metrics.

At (306), the method 300 includes determining, via one or more control devices, one of the plurality of antenna modes as a selected antenna mode for the outdoor antenna based, at least in part, on the data indicative of the channel quality indicator for each of the plurality of antenna modes. At (308), the method 300 includes configuring, via the one or more control devices, the outdoor antenna in the selected antenna mode. For instance, the one or more control devices can control operation of the switching device to couple one or more the log-periodic antennas to the RF transceiver in order to configure the outdoor antenna in the selected antenna mode.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of controlling operation of an outdoor antenna communicatively coupled to a repeater and configured to communicate with a cellular base station, the method comprising:
   configuring, via one or more control devices, the outdoor antenna in each of a plurality of antenna modes, each of the plurality of antenna modes having a distinct radiation pattern;
   obtaining, via the repeater, data indicative of a channel quality indicator associated with communications between the outdoor antenna and the cellular base station while the outdoor antenna is configured in each of the plurality of antenna modes;
   determining, via the one or more control devices, one of the plurality of antenna modes as a selected antenna mode for the outdoor antenna based, at least in part, on the data indicative of the channel quality indicator for each of the plurality of antenna modes; and
   configuring, via the one or more control devices, the outdoor antenna in the selected antenna mode.

2. The method of claim 1, wherein configuring the outdoor antenna in the each of the plurality of antenna modes comprises controlling, via the one or more control devices, operation of a switching device to selectively couple one or more log-periodic antennas to a RF transceiver of the repeater to configure the outdoor antenna in each of the plurality of antenna modes.

3. The method of claim 2, further comprising:
   adjusting, via the one or more control devices, an RF transmit power associated with each of the one or more log-periodic antennas coupled to the RF transceiver to maintain a gain of each of the one or more log-periodic antennas.

4. The method of claim 2, wherein controlling operation of the switching device to selectively coupled the one or more log-periodic antennas to the RF transceiver of the repeater comprises:
   modulating, via the one or more control devices, one or more control signals onto an RF signal; and
   transmitting, via the one or more control devices, a modulated RF signal to the outdoor antenna, the modulated RF signal corresponding to the RF signal having the one or more control signals modulated thereon.

5. The method of claim 2, wherein configuring the outdoor antenna in the selected antenna mode comprises:
   in response to determining the selected antenna mode, controlling, via the one or more control devices, operation of the switching device to couple the one or more log-periodic antennas to the RF transceiver of the repeater to configure the outdoor antenna in the selected antenna mode.

6. The method of claim 5, wherein the outdoor antenna comprises a directional radiation pattern in the selected antenna mode.

7. The method of claim 5, wherein the outdoor antenna comprises an omni-directional radiation pattern in the selected antenna mode.

8. The method of claim 1, wherein the data indicative of the channel quality indicator (CQI) comprises at least one of a received signal strength indicator (RSSI), signal-to-noise radio (SNR), and signal-to-interference-plus-noise ratio (SINR).

* * * * *